United States Patent

[11] 3,596,531

| | | |
|---|---|---|
| [72] | Inventor | Albert Grosseau<br>Chaville, France |
| [21] | Appl. No. | 860,358 |
| [22] | Filed | Sept. 23, 1969 |
| [45] | Patented | Aug. 3, 1971 |
| [73] | Assignee | Société Anonyme Automobiles Citroen<br>Paris, France |
| [32] | Priority | Oct. 8, 1968 |
| [33] | | France |
| [31] | | 3564 |

[54] TELESCOPIC STEERING COLUMN GEAR-CHANGE MECHANISM
5 Claims, 3 Drawing Figs.

[52] U.S. Cl. .................................................. 74/484,
74/473 SW
[51] Int. Cl. .................................................. G05g 13/04
[50] Field of Search ........................................ 74/484,
485, 486, 473, 493, 473 SW

[56]         References Cited
         UNITED STATES PATENTS
3,518,895  7/1970  Bucchler ................. 74/493

*Primary Examiner*—Milton Kaufman
*Attorney*—Arnold Robinson

ABSTRACT: A steering column gear-change linkage is capable of accommodating adjustments in two perpendicular directions of a steering column which is telescopic. A support arrangement movable with respect to a fixed support, such as an automobile scuttle incorporates slides having slots extending in said two perpendicular directions. Movement in a vertical plane about a pivot axis is accommodated at a position remote from the steering column head by a slide cooperating with splines on a control tube, angular movement about the longitudinal axis of which is effected by a control lever. The slide is rigid with a lever connected by a linkage with the gearbox. Movement of the control lever axially of the control tube serves to control the gearbox selector rods through a rod coaxial with the control tube and a bowden cable.

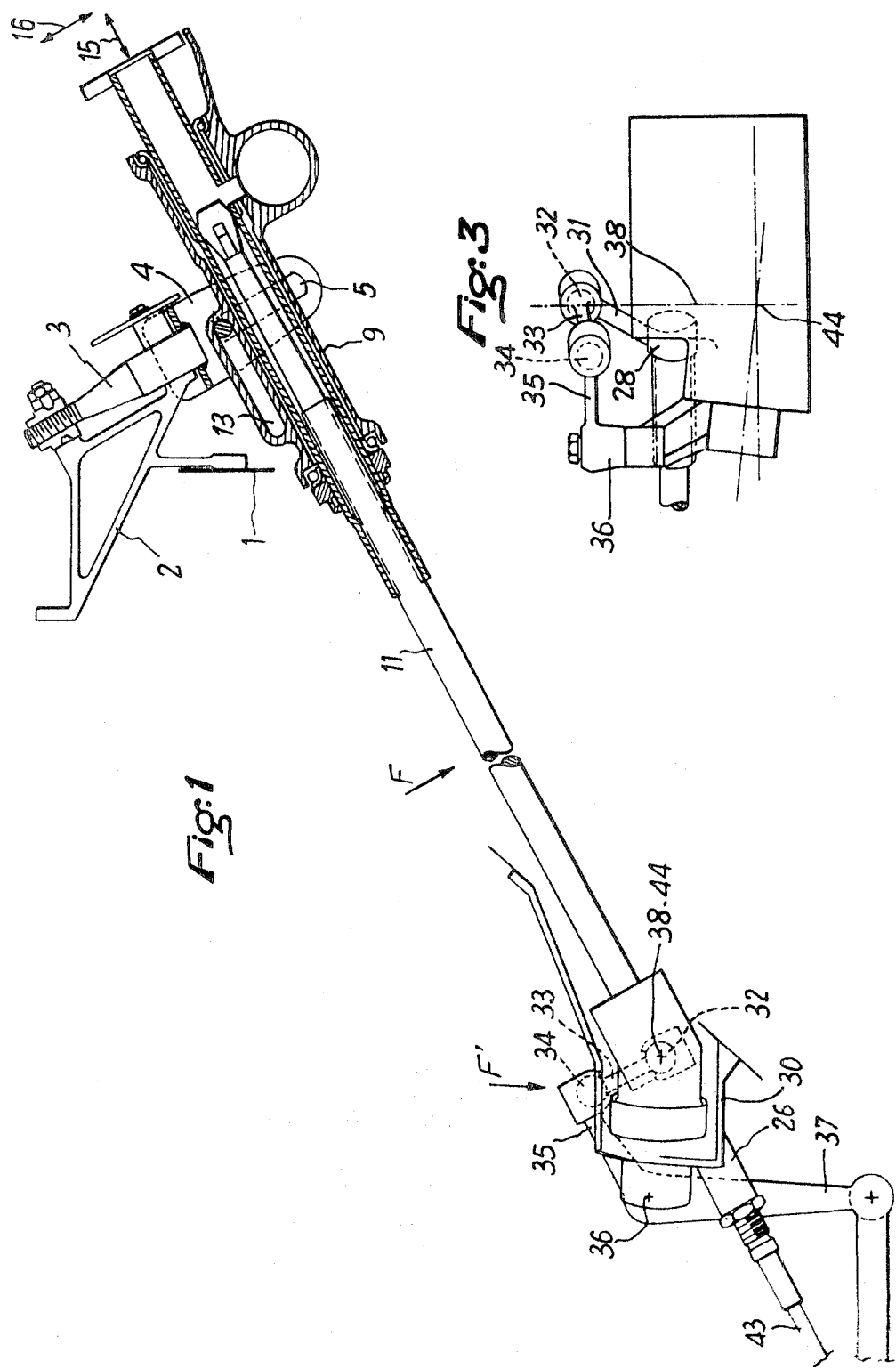

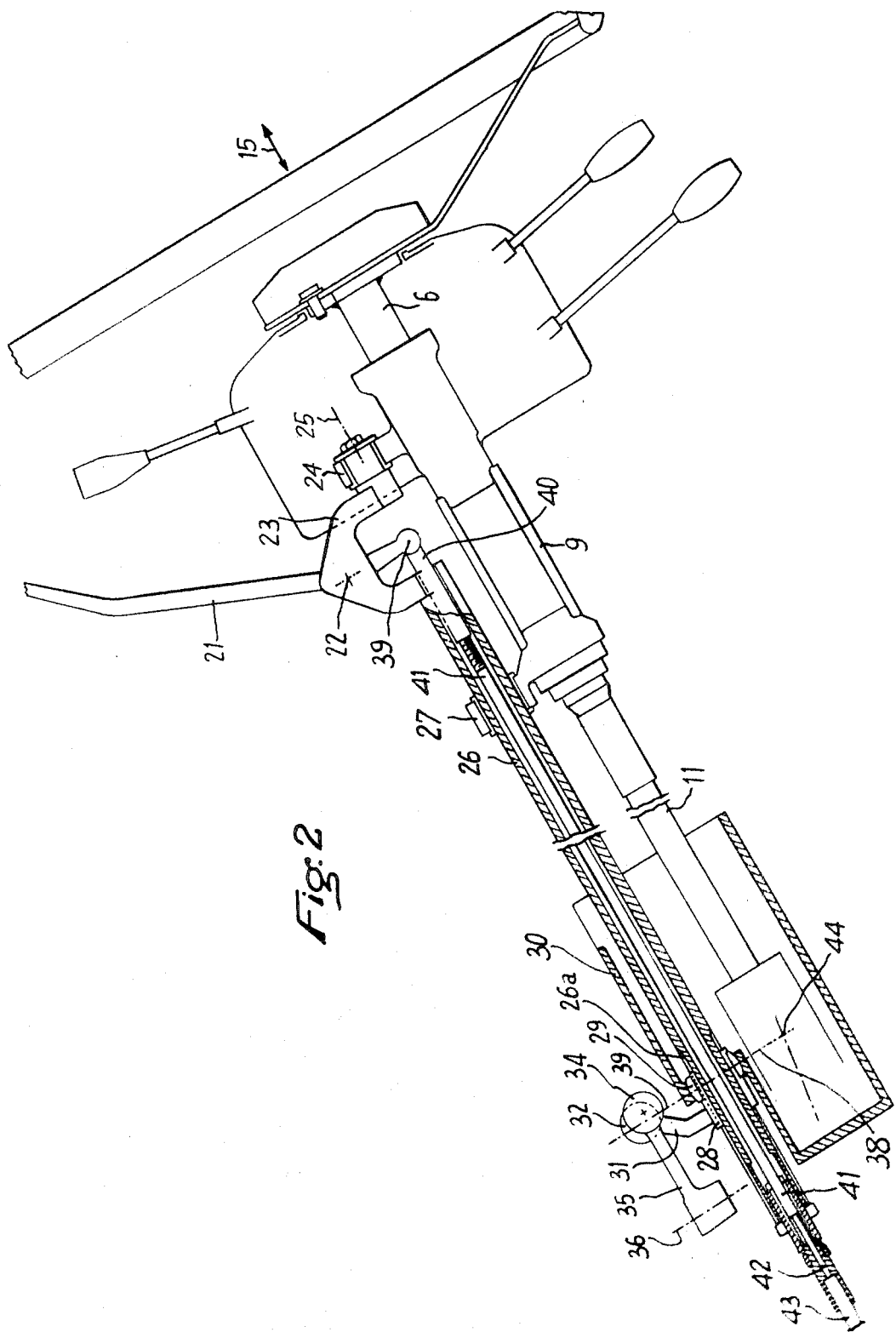

TELESCOPIC STEERING COLUMN GEAR-CHANGE MECHANISM

BACKGROUND OF THE INVENTION

Field of the Invention

The present invention relates to a control device for use, for example, in actuating a change speed gearbox.

SUMMARY OF THE INVENTION

According to the present invention there is provided a control arrangement mounted on a support movable with respect to a fixed member and enabling, by means of a control member, the transmission of movements under conditions such that the characteristics of the functions controlled are not disturbed by changes in position of the support movable within predetermined limits, in operation a pivotal motion about one axis and a translational motion taking place perpendicularly to this pivot axis, wherein the control member of said control arrangement arranged to carry out a pivotal movement perpendicular to the translational movement of the movable support, is carried by a connecting member which is slidably keyed in a bearing pivoted to the fixed member coaxially with the pivot of the movable support and wherein said bearing is rigid with an arm which is connected through a connecting rod to a member to be controlled through a swivel joint of which the center of swiveling lies on the said pivot.

In the case where the control member can, furthermore, be displaced in dependence upon a pivotal movement in a plane passing through the translational direction of the movable support, for example in order to actuate a second member, the connecting member can be a tube and the control member can be pivoted on a rod which passes through the connecting tube and is connected to a cable in a sheath, this sheath being secured to the connecting tube.

The present invention is particularly applicable for the control of a change speed gear box with the aid of a lever which is carried by a casing capable of being displaced angularly and subjected to translational movement, for example parallel to the axis of the steering column. In this case, the control member is constituted by the control lever of the gearbox.

BRIEF DESCRIPTION OF THE DRAWINGS

There is described hereafter, by way of example, an embodiment of a change speed gearbox control device in accordance with the invention with reference to the accompanying drawings, in which:

FIG. 1 is a general view in elevation of the assembly serving for the support of the device in accordance with the invention;

FIG. 2 is a plan view, as indicated by the arrow F of FIG. 1, in partial section, showing the device as well as the connection with the movable support on which it is mounted, and FIG. 3 is a plan view of a detail as indicated by the arrow F' of FIG. 1.

DESCRIPTION OF THE PREFERRED EMBODIMENT

In the drawings, the internal scuttle 1 of the vehicle on which is secured the movable device serving as a support, the device itself is fixed on the scuttle by a bracket 2.

An axially adjustable shifter 3 is equipped with webs 4 including guide slots 5 allowing the angular displacement of the steering column about a pivot point 44. The provision of a slot 13 in a casing 9 and the division of the column into two coaxial sliding sections 6 and 11 allows for the axial movement of the device. Thus, the resultant play of the slide members arranged at right angles to one another along 5 and 13 and the telescopic ability of the steering column ensures a freedom of control for adjustment in the planes indicated by the double-headed arrows 15 and 16.

In this embodiment a movable support just described, the control lever 21 of the change speed gearbox is pivotally mounted at 22 in a stirrup 23. This stirrup 23 is itself pivotally mounted in a bearing 24 rigid with the casing 9, about an axis 25 parallel to the axis of the steering column. The stirrup 23 is rigid with a tube 26 which is pivotally mounted in a bearing 27 likewise rigid with the casing 9. The tube 26 is grooved or splined at its lower part as indicated at 26a and is slidably mounted in a bushing 28, likewise grooved, which is mounted, through a swivel joint 29, in a fixed housing 30. The bearing 28 which may swivel on joint 29 relative to the fixed housing 30, is rigidly connected to an arm 31 of which the end is connected through a swivel joint 32 to one of the ends of a link 33. The other end of this link 33 is connected, through a swivel joint 34 to an arm 35 which is pivotally mounted at 36 with respect to the housing 30. This arm 35 is connected in a conventional manner through a system of rods 37, to the selection lever of the selector rods of the change speed gearbox. The centers of the swivel joints 29 and 32 lie on a common chain line 38 perpendicular to the plane of pivotal movement of the steering column and meet as a perpendicular line at 44 on this plane, the point 44 being the center of pivotal movement of the steering column 11 in the embodiment described.

Furthermore, the end of the lever 21 is pivoted at 39 on a tube 40. In the tapped end of the latter the upper end of a rod 41 is screwed which is slidably mounted in the tube 26. The lower end of this rod is fixed to a cable 42 slidable in a sheath 43 of which the end is secured to the tube 26. The cable 42 is connected to the drive lever (not shown) of the selection rods.

It is clear that under these conditions, the displacements of the "support" column in the direction of the arrow 15 have no effect on the control device described, as well as on the arm 35, assuming the slidable mounting of the arm 31 with respect to the tube 26, and with respect to the cable 42, its sheath being displaced at the same time as the cable itself.

Similarly, displacements in the direction of the arrow 16 are clearly without effect on the action of the cable 42. They are also without effect on the lever 35 since the movable part pivots about the axis 38 which passes through the center of the swivel joint 32.

When the control lever for the change speed gearbox 21 is adjusted the displacements of the cable 42 and of the lever 33 are effected independently of the position of the casing 9. In particular, if the lever 21 is caused to pivot in a plane perpendicular to the axis of the steering column, the tube 26 pivots thus entraining the bearing 28 and the arm 31. The latter forces in its turn the arm 35 to pivot through the intermediary of the link 33.

In a modification the cable 43 and the lever 35 can control any other member than a change speed gearbox and the support "casing" 9 can be any other member than a casing associated with steering of a vehicle.

I claim:

1. A motion control arrangement comprising a fixed structure, support means pivotally mounted with respect to the fixed structure, a control member, movements of which can be transmitted so that the characteristics are undisturbed by changes in position of the movable support means within predetermined limits, a pivotable connecting member carrying the control member, bearing means pivotally mounted on the fixed structure, coaxially with the pivot axis of the said connecting member, said connecting member being slidably keyed in said bearing means, an arm, a connecting rod and a swivel joint, said arm being rigid with said bearing means and connected to said connecting rod through the swivel joint, the swivel center of which lies on the pivot axis of the said support means.

2. An arrangement according to claim 1, wherein said connecting member is a tube, said arrangement further comprising a rod passing through the tube, a cable secured to the rod, and a sheath slidably carrying the cable, said sheath being connected to the tube, the said control member being pivotally movable in a plane parallel to the direction of translational motion of the movable support means in order to actuate said rod and cable.

3. An arrangement according to claim 2, wherein said control member is a lever pivotally mounted in the connecting tube and articulated to the rod.

4. An arrangement according to claim 1 wherein said connecting member extends parallel to the direction of displacement of the movable support means.

5. An arrangement according to claim 1 wherein the control member serves to actuate the selector rods of a change speed gearbox, said control member taking the form of a gearbox lever mounted on a steering column and arranged for angular movement in two planes, said steering column comprising said support means.